United States Patent [19]

Hurst

[11] Patent Number: 4,894,539
[45] Date of Patent: Jan. 16, 1990

[54] LEAK DETECTOR

[75] Inventor: James A. Hurst, Stockton-on-Tees, England

[73] Assignee: Imperial Chemical Industries PLC, London, England

[21] Appl. No.: 352,611

[22] Filed: May 16, 1989

Related U.S. Application Data

[63] Continuation of Ser. No. 88,359, Aug. 24, 1987, abandoned.

[30] Foreign Application Priority Data

Aug. 22, 1986 [GB] United Kingdom ................. 8620500

[51] Int. Cl.$^4$ ............................................. G21H 5/02
[52] U.S. Cl. .................................. 250/303; 73/40.5 R
[58] Field of Search ....................... 250/303; 73/40.5 R

[56] References Cited

U.S. PATENT DOCUMENTS 3,093,739 6/1963 Danforth et al. .................... 250/303
4,016,748 4/1977 Boyens ............................. 73/40.5 R

FOREIGN PATENT DOCUMENTS 2030430 4/1980 United Kingdom .

OTHER PUBLICATIONS

Japanese Abstract, vol. 1, No. 124, p. 5325, E 77, Oct. 18, 1977.

Primary Examiner—Jack I. Berman
Attorney, Agent, or Firm—Cushman, Darby & Cushman

[57] ABSTRACT

A method for determining the position of a leak in a conduit or pipeline, especially one of small diameter, in which a carrier body, for example a short length of co-axial cable, carrying a short-lived radioisotope is inserted into the conduit or pipeline and is caused to move along it by pressuring up the conduit or pipeline from one or both ends thereof with fluid, for example water. The carrier body travels to the leak but no further and its location is detected from outside the conduit or pipeline using a radiation detector.

5 Claims, 1 Drawing Sheet

LEAK DETECTOR

This is a continuation of Ser. No. 088,359, filed 8/24/87, now abandoned.

The present invention relates to a method and apparatus for the determination of leaks in pipelines, conduits and the like.

Pipelines of various kinds are now in widespread use in many parts of the world for the easy transportation of liquids, gases and solids. The size of such pipelines varies considerably, some being several feet in diameter while others are much smaller and their length also varies considerably.

It is essential that so far as is possible a pipeline should be so constructed and located that there is no possibility of its integrity being prejudiced. Lines are usually made of robust materials and located so that any possibility of accidental damage is minimised. Nevertheless it is not unknown for leaks to occur, caused either by accidental damage or by some flaw in the wall of the pipeline. Many of the materials now carried in pipelines are hazardous in one way or another but even if there is no danger to human life it is still essential to find and seal the leak as quickly as possible so as to prevent any environmental damage to the locality in which the pipe is laid. Thus a number of methods of detecting leaks in pipelines and the like have been proposed in the last few years.

The present invention relates to a novel method for accurately and quickly determining the position of a leak. Although applicable broadly, to pipelines of all diameters, it is particularly suited for determining the position of a leak in a relatively narrow bore pipeline or conduit, for example in conduits of diameters ranging from a few inches down to less than an inch.

According to the present invention a method for determining the position of a leak in a pipeline or conduit or the like comprises:

(i) providing within the pipeline or conduit a carrier body housing a radioactive isotope sealably enclosed within it, said carrier body being of a size and a shape such as to enable it to move freely along said pipeline or conduit;

(ii) applying fluid pressure to at least one end of the pipeline or conduit thereby to cause the carrier body to move along the pipeline or conduit until it reaches the leak; and (iii) scanning the pipeline or conduit with radiation detection means to determine the location therein of the radioisotope housed within the carrier body.

In one preferred method according to the present invention the carrier body is moved to a location which suitably is approximately half-way along the length of the pipeline or conduit. The pipeline or conduit is then pressured up from one end with the other end closed. If the leak is between the half-way point and the closed end of the pipeline or conduit the carrier body will move to the leak. If the carrier body does not move, the leak is clearly between the open end and the approximate half-way point, where the carrier body is; its exact location is determined by reversing the process and pressuring up the pipeline or conduit from the hitherto closed other end.

In a further preferred method according to the present invention one end of the pipeline or conduit is kept closed while the carrier body is moved along it from the other, open, end by pressuring up from that end. The carrier body will travel to the leak and no further.

In yet a further preferred method the pipeline or conduit may be pressured up from both ends simultaneously in which case the initial position of the carrier body can be at any point in the pipeline or conduit.

Some care may need to be taken to avoid a spurious indication of a leak. The carrier body may cease its movement when it reaches the leak or occasionally its movement may be halted by a constriction in the pipeline or conduit. To check that a constriction is not present, the hitherto closed end of the pipeline is opened and pressure is applied from the other end, as before. Movement of the carried body towards the newly opened end indicates that no constriction is involved.

A wide range of radioisotopes is suitable for incorporation in the carrier body but it is preferred to use those of relatively short half-life, for example gold-198 and sodium-24, so that if they are lost during use they decay to very low activity very quickly.

The carrier body or "pig" may be any suitable shape provided that it can move freely along the pipeline or conduit without sticking to the walls. Thus, the pig may be substantially cylindrical with rounded ends or substantially cylindrical with pointed ends although preliminary experiments by the Applicants in small diameter conduit appear to indicate that a spherical shaped pig may be the preferred shape.

After use, the carrier body may be recovered either at the leak point or by moving it to one or other end of the pipeline or conduit.

Any suitable radiation detection means may be used, for example a portable scintillation detection system. The detection means may be fitted to Remotely Operated Vehicles or other vessels for use in sub-sea locations.

The method of this invention may be applied either on land, to already installed subterranean pipes or conduits and for example to long lengths of pipeline or conduit when they are first pressure tested before use, or at sea, for example to conduits and pipelines already installed on the sea bottom. The method may be applied to pipelines and conduits of a wide range of diameters down to 3/16' at least, and perhaps even less. The method may also be applied to pipelines which are provided with a protective coat, for example of concrete. Such pipelines frequently extend for long distances and often the first indication of a leak is seepage from the concrete cover at the end of the line or at an intermediate pumping station. The method of this invention allows the leak to be quickly and accurately located.

The method of this invention has marked advantages over conventional methods of leak testing using radioactive tracers. In such prior art methods it has been proposed to add the tracer to the liquid in a pipeline and either trace its progress along the line to the leak or put the liquid with the tracer under pressure, wash it out and then find the residual activity inside the pipeline with a portable radiation detector. In both cases the radioactive tracer is lost and both methods also cause contamination of the pipeline which therefore would have to be cleaned and controlled. The method of the present invention avoids these disadvantages.

The present invention is hereinafter further described with reference to the accompanying drawings in which.

Figure 1:
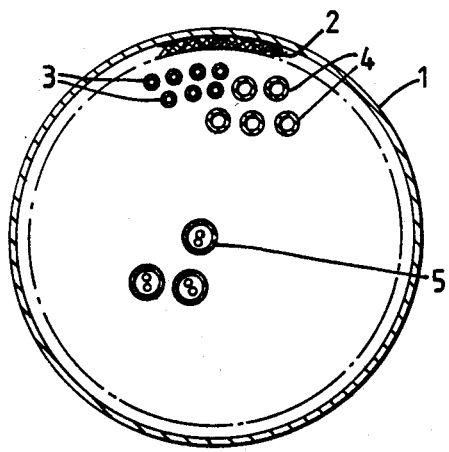
FIG. 1 illustrates a section through a multicore conduit.

Referring to FIG. 1, a multicore conduit has an outer covering 1, armoured protecting material 2 and carries conduits of varying diameters 3, 4, 5 to convey for example hydraulic fluids (3, 4) or serving as electrical conduits (5), the latter of which may be housed substantially in the centre of the conduit. Such multicore conduits are typically 6" in diameter and may be 5000 meters or more in length. Conduits 3, 4 may be as small as 3/16" in diameter.

Figure 2A:
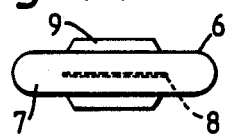
FIG. 2 is a schematic representation of a carrier body.
Figure 2B:
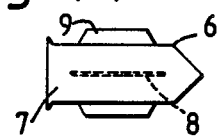

Before use conduits 3, 4 and 5, are fluid pressure tested, for example with water. If any of these conduits leaks the method of the invention may be used to identify the location of the leak. Referring to FIG. 2, the carrier body ("pig") 6 may be a short length of a co-axial cable 7 having within it a small radioactive gold pellet or a short length of a radioactive gold wire (gold-198), 8. The gold wire or pellet is sealed within the co-axial cable so that it cannot contaminate the conduit to be tested in any way. Optionally, flexible stabiliser fins 9 may be fitted on the outer surface of the pig. FIGS. 2(a) and 2(b) illustrate two possible designs for the pig 6.

Figure 3:
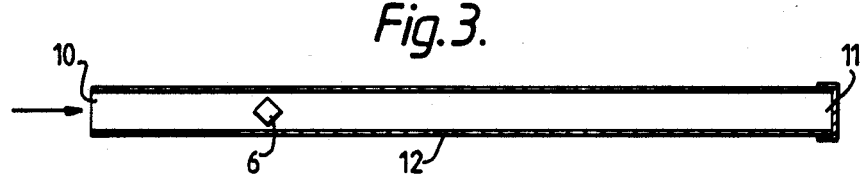
FIGS. 3 and 4 are schematic representations of a conduit to illustrate operation of the method of the invention.

In use, the pig 6 is initially located at one end 10 (see FIG. 3) of the conduit to be tested and is moved along the conduit by water pressure, shown by the arrow. The opposite end 11 of the conduit is closed off. The pig 6 will go as far as the leak 12 and no further.

Figure 4:
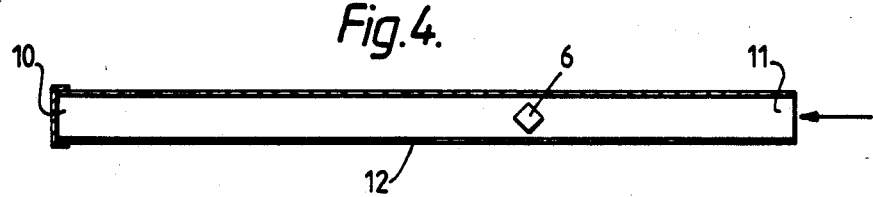

To check that the pig has not been held up at a constriction in the conduit the closed end 11 is opened, water pressure still being applied from end 10. The pig 6 will resume its progress along the conduit if no constriction is involved. The pig can then be returned to the leak by closing off end 10 and applying water pressure at end 11 (see FIG. 4). Progress of the pig 6 throughout all these operations is easily followed by use of a portable scintillation detector system moved along the outside of the conduit.

I claim:

1. A method for determining the position of a leak in a pipeline or conduit which comprises
    (i) providing within the pipeline or conduit a carrier body housing a radioactive isotope sealably enclosed within it, said carrier body being of a size and a shape such as to enable it to move freely along said pipeline or conduit;
    (ii) providing radiation detection means for scanning the pipeline or conduit to determine the progress and location therein of the radioisotope housed within the carrier body;
    (iii) pressuring up the pipeline or conduit from a first end with the second end closed and determining the location of cessation of the movement of the carrier body with said radiation detection means; and
    (iv) opening up the closed end of the pipeline or conduit to detect movement of the carrier body towards said closed end to indicate that said cessation of movement is due to a leak and not to a constriction in the pipeline or conduit.

2. A method as claimed in claim 1 wherein the carrier body is substantially cylindrical with rounded or pointed ends.

3. A method as claimed in claim 2 wherein the carrier body is a short length of co-axial cable having within it a small radioactive pellet or short length of radioactive wire.

4. The method of claim 1 wherein, when no constriction is noted, the first end of the pipeline is closed and the carrier body is moved back to the leak by applying fluid pressure from the second end of the pipeline.

5. The method of claim 1 wherein the carrier body is positioned at about the mid-point of the length of the pipeline before pressuring up as in (iii) and if the carrier body does not move, the first end is closed and fluid pressure is applied through the second end.

* * * * *